US00RE37027E

(19) United States
(12) Reissued Patent
Török

(10) Patent Number: US RE37,027 E
(45) Date of Reissued Patent: Jan. 23, 2001

(54) ELECTRIC MOTOR WITH COMBINED PERMANENT AND ELECTROMAGNETS

(76) Inventor: Vilmos Török, Carl Milles v. 7, Liningö(SE), 18134

(21) Appl. No.: 08/576,463

(22) PCT Filed: Dec. 27, 1991

(86) PCT No.: PCT/SE91/00909

§ 371 Date: Jun. 28, 1993

§ 102(e) Date: Jun. 28, 1993

(87) PCT Pub. No.: WO92/12567

PCT Pub. Date: Jul. 23, 1992

Related U.S. Patent Documents

Reissue of:
(64) Patent No.: 5,345,131
Issued: Sep. 6, 1994
Appl. No.: 08/081,297
Filed: Dec. 27, 1991

(30) Foreign Application Priority Data

Dec. 28, 1990 (SE) ..... 9004168

(51) Int. Cl.[7] ..... H02K 37/02
(52) U.S. Cl. ..... 310/181; 310/49 R; 310/154; 310/168; 310/254; 310/261; 310/269
(58) Field of Search ..... 310/181, 179

(56) References Cited

U.S. PATENT DOCUMENTS 3,999,107 * 12/1976 Reuting ..... 318/135
4,201,929 * 5/1980 Sudler et al. ..... 310/49 R
4,206,376 * 6/1980 Sudler et al. ..... 310/49 R
4,629,924 * 12/1986 Grosjeen ..... 310/257
4,647,802 * 3/1987 Konecny ..... 310/49 R
4,758,752 * 7/1988 Leenhouts ..... 310/49 R
4,947,066 * 8/1990 Ghibu et al. ..... 310/49 R
5,023,502 * 6/1991 Johnson ..... 310/261
5,117,144 * 5/1992 Torok ..... 310/269

FOREIGN PATENT DOCUMENTS

2707684 * 7/1978 (DE) .
WO9002537 * 3/1990 (WO) .

* cited by examiner

*Primary Examiner*—Steve Stephan
*Assistant Examiner*—Elvin G. Enad
(74) *Attorney, Agent, or Firm*—Browdy and Neimark

(57) ABSTRACT

A rotary electric motor has a stator core (1) with salient poles (4, 3), some of them ferromagnetic and some of them permanent-magnetic, which are spaced-apart and which are all simultaneously magnetizable by means of a magnetizing winding (5A, 5B). The rotor core has either reluctance poles (7) with intervening pole gaps and constant pole pitch, or permanent-magnetic poles (10) with constant pole pitch and without intervening pole gaps, alternating poles being of opposite polarities. Each reluctance pole (7) or permanent-magnetic pole (10) has a width which over a portion of the pole corresponds to respectively one-half of or the full pole pitch and is smaller over the remaining portion so that each pole (7 or 10) has a part (7B or 10A) which projects in a direction common to all poles. The ferromagnetic and permanent-magnetic poles (3, 4) of the stator (1) have a width corresponding to the width of the narrower portion of the poles (7 or 10) of the rotor (2). The number of permanent-magnetic poles (3) and, optionally, also the number of ferromagnetic poles (4) of the stator (1) is smaller than the number of reluctance poles (7) or permanent-magnetic poles (10) of the rotor (2), the positioning of the poles being such that when the motor is running, all ferromagnetic stator poles (4) will be simultaneously positioned opposite respective rotor poles (7 or 10) and all permanent-magnetic stator poles (30 likewise are simultaneously positioned opposite respective rotor poles (7 or 10).

20 Claims, 2 Drawing Sheets

Fig. 4
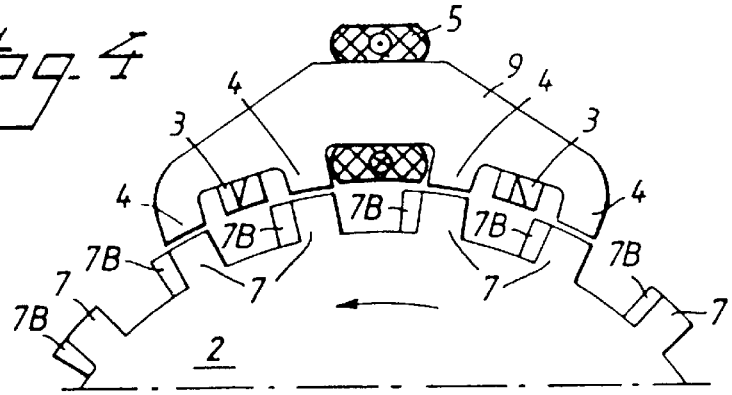
Fig. 5
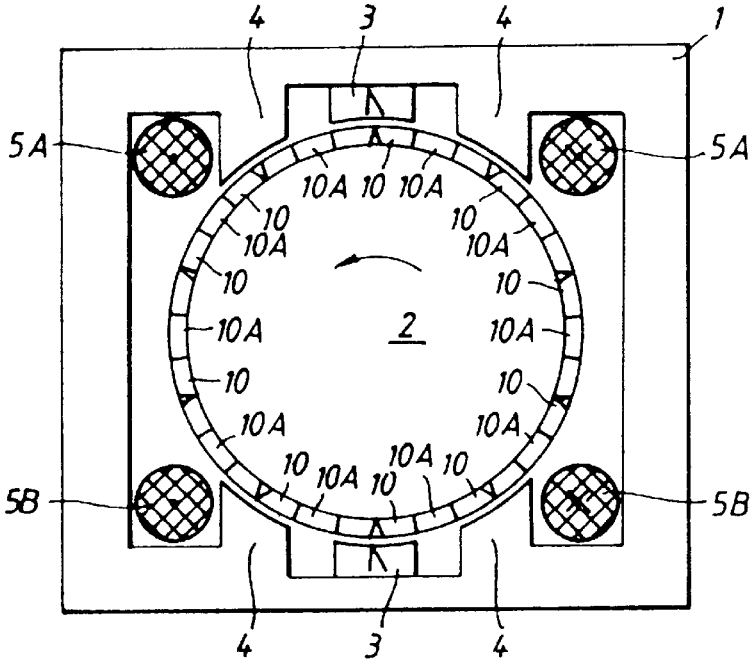
Fig. 6

ELECTRIC MOTOR WITH COMBINED PERMANENT AND ELECTROMAGNETS

Matter enclosed in heavy brackets [ ] appears in the original patent but forms no part of this reissue specification; matter printed in italics indicates the additions made by reissue.

BACKGROUND OF THE INVENTION

Technical field and Prior Art

The present invention relates to a rotary electric motor which has a single, predetermined direction of rotation and which can be controlled in respect of its supply with current and its speed by a simple electronic circuit. The motor is a further development of the type of motor described and shown in Swedish Patent Application 8802972-3 (=WO 90/02437).

OBJECT OF THE INVENTION

The motor described and illustrated in the aforesaid Swedish patent application has been found to function very well and affords all of the advantages recited in the application. Continued development has shown, however, that further improvements in the form of lower manufacturing costs and/or higher motor torque can be achieved without change of the motor size, at least for some fields of use, by constructing the motor in a manner which deviates slightly from the manner described in the aforesaid Swedish patent application.

According to the present invention, these further improvements are obtained with a motor constructed according to the invention, without losing any of the advantages afforded by the basic motor design, as described in the aforesaid patent application.

BRIEF DESCRIPTION OF THE DRAWINGS

The invention will now be described in more detail with reference to a number of exemplifying embodiments thereof and also with reference to the accompanying drawings, in which:

FIG. 4 is a schematic principle partial end view of a fourth exemplifying embodiment of a motor according to the invention;

FIG. 5 is a schematic principle end view of a fifth exemplifying embodiment of a motor according to the invention; and FIG. 6 is a schematic developed view of the construction and the arrangement of the rotor poles in the motor illustrated in FIG. 5.

DETAILED DESCRIPTION OF THE PREFERRED EMBODIMENT(S)

Figure 1:
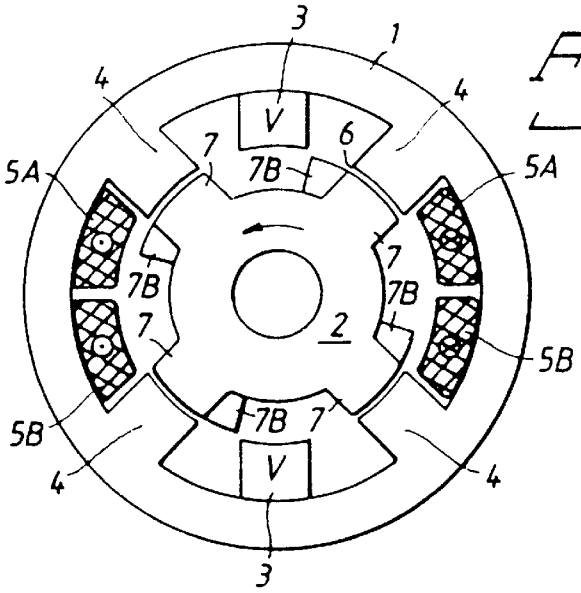
FIG. 1 is a schematic, principle end view of a first exemplifying embodiment of a motor according to the invention.

As explained in Swedish Patent Application 8802972-3, the type of motor described therein operates in accordance with the reluctance principle. One of the two mutually rotatable parts of the motor, normally the rotor, is provided with a ring of ferromagnetic reluctance poles arranged with a uniform pole pitch and uniform pole gaps, and the other part of the motor, normally the stator, is provided with a ring of alternating ferromagnetic poles and permanent-magnetic poles, which are magnetized with the aid of a magnetizing winding.

The number of permanent-magnetic poles and the number of ferromagnetic poles equal the number of reluctance poles on the rotor, such that the pole pitch of the stator is half the pitch of the rotor poles.

Furthermore, each rotor reluctance pole has a width in the rotational or circumferential direction which over a portion of the reluctance pole equals half the pole pitch of the reluctance poles and which over the remaining portion of the pole is smaller and preferably corresponds to a third of the pole pitch of the reluctance poles, such that each reluctance pole has a part which projects in a predetermined rotational direction common to all reluctance poles.

The ferromagnetic and permanent-magnetic stator poles have a width as measured in the direction of rotation which essentially equals the reduced width of the rotor reluctance and are magnetically divided into groups of mutually adjacent ferromagnetic and permanent-magnetic poles, with the same number of each pole type in each group. All permanent-magnetic poles within each such magnetic pole group have the same permanent-magnetic polarity and all of the permanent-magnetic and the ferromagnetic poles are magnetized in one and the same direction through the influence of the magnetizing winding.

With this design, the motor has only one, predetermined start direction, but current can be delivered to the motor and its speed controlled by means of a very simple and inexpensive electronic supply circuit. Motors of this design can therefore be used economically for purposes for which it has not earlier been possible to use electronically controlled motors, for reasons of economy.

As before mentioned, the present invention is a further development of the tape of motor described and illustrated in Swedish Patent Application 8802972-3 (=WO 90/02437), and is primarily based on the realization that in this kind of motor the primary purpose of the permanent-magnetic poles is to enable the motor to start independently.

This requires the number of permanent-magnetic poles present and/or the strength of these poles to be sufficient to overcome the static friction of the motor and the object driven thereby when the permanent-magnets alone, i.e. when no current flows through the magnetizing winding, draw the rotor from a position it has adopted under the influence of the current-conducting magnetizing winding, this position being referred to as the "indrawn position" in the Swedish Patent Application 8802972-3 (=WO 90/02437), to a position from which a working winding through which magnetizing current again flows is able to rotate the rotor in the predetermined direction. This latter position is referred to as the "start position" in the aforesaid Swedish patent application. Admittedly, the permanent-magnetic poles assist in generating a certain amount of motor torque, since the work developed by a permanent-magnetic pole when attracting a reluctance pole is greater than the work developed when releasing the same reluctance pole. However, it is the aforesaid independent starting of the motor in the said predetermined start direction which is the primary and absolutely necessary purpose of the permanent-magnetic poles of the motor.

The present invention is based on the realization that because of the aforedescribed circumstance, the number of permanent-magnetic poles provided, or the strengths of said Doles, can be reduced when a motor of this type is used to drive loads which have low starting torques. In view of the comparatively expensive material from which the permanent-magnetic poles are made, a reduction in the number of permanent-magnetic poles of the motor will result in a significant cost saving.

A reduction in the number of permanent-magnetic poles, however, is still more advantageous from the point of view that more space can be provided for the magnetizing winding, while keeping the dimensions of the motor unchanged, so as to enable the ampere turns of the magnetizing winding and, consequently, the torque generated by the motor, to be increased substantially, without increasing the outer dimensions of the motor, despite the reduction in the number of permanent-magnetic poles.

FIG. 1 is a schematic end view of a first exemplifying embodiment of a motor based on the aforedescribed inventive principle.

The motor illustrated in FIG. 1 includes a stator 1 having a ferromagnetic core, and a rotor 2 having a ferromagnetic core and an intermediate, cylindrical air gap 6. As is the case in the motors described in Swedish Patent Application 8802972-3 (=WO 90/2437), the rotor 2 is provided with a number of salient ferromagnetic reluctance poles 7, in the illustrated case four such poles, arranged in uniform spaced relationship. Each such reluctance pole 7 has a width in the direction of rotation which over a portion of the pole corresponds essentially to one-half pole pitch and which over the remaining portion of the pole is smaller and preferably corresponds to one-third of the pole pitch. Consequently, each reluctance pole has nose 7B which projects in a predetermined direction of rotation, in the manner described in the aforesaid Swedish patent application.

The stator 1 is provided with four uniformly distributed salient ferromagnetic reluctance poles 4, whose widths in the direction of rotation correspond essentially to the narrower width of the rotor reluctance poles 7 and all of which will thus be located simultaneously opposite a rotor reluctance pole 7 when the motor runs. The stator 1 is also provided with two diametrically opposed permanent-magnetic poles 3 of mutually opposite polarities in relation to the air gap 6.

When seen magnetically, the reluctance poles 4 and the permanent-magnet poles 3 on the stator are divided into two diametrically opposed groups, each comprising two reluctance poles 4 and an intermediate permanent-magnetic pole 3 and each provided with an associated magnetizing winding 5A and 5B, respectively, for magnetizing all poles in a particular group simultaneously and in the same direction, namely preferably in the direction which is opposite to the permanent-magnetic polarity of the permanent-magnetic pole 3.

Since the two magnetizing windings 5A and 5B are intended to car current simultaneously and in mutually the same direction, it will be understood that these windings may also be constructed in the form of a single winding.

It will be seen that in comparison with the motor described in Swedish Patent Application 8502972-3 (=WO 90/02437), the motor according to the invention as illustrated in FIG. 1 lacks two permanent-magnetic stator poles and that the space which would otherwise be occupied by these permanent-magnetic poles instead accommodates the magnetizing windings 5A, 5B. This has enabled the total conductor cross-section of the magnetizing windings and, consequently, the magnetomotive force or ampere turns of the windings, to be increased considerably. As a result, a corresponding increase in the torque generated by the motor has been achieved which more than makes up for the reduction in motor torque caused by the reduction in the number of permanent-magnetic stator poles.

There is thus provided a motor whose overall dimensions remain unchanged but which nevertheless generates a higher torque and can be manufactured at lower cost because of the reduced number of permanent-magnetic poles provided.

The motor according to the illustrated in FIG. 1 has, in general, all of the advantages afforded by a motor of the kind described and illustrated in Swedish Patent Application 8802972-3 (=WO 90/02437). This motor can be driven and its speed controlled with the aid of a very simple electronic supply circuit, for instance a circuit of the kind described in the Swedish patent application.

If the number of reluctance poles 4 in each of the two diametrically opposed pole groups on the stator is increased in a motor of the kind described above and illustrated in FIG. 1, the least possible number of permanent-magnetic poles 3 will still be only one in each pole group, it being possible to place this permanent-magnetic pole in any selected gap between the reluctance poles 4 in the group concerned.

The motor will have the highest torque density, however, when a permanent-magnetic pole 3 is placed in each interspace between the reluctance poles 4 in the pole group concerned, since the omission of permanent poles in these interspaces will not result in greater space for the accommodation of the magnetizing winding. Thus, in this case, the number of permanent-magnetic poles 3 per pole group on the stator 1 will be equal to the number of reluctance poles 4 in each pole group minus 1.

If the number of stator pole groups in a motor of the kind described above and as illustrated in FIG. 1, is increased from two to an integral multiple of two, the smallest possible number of permanent-magnetic poles on the stator will still be two, with mutually opposite polarities relative to the air gap, placed in two different pole groups. The highest torque density, however, will be obtained with a permanent-magnetic pole placed in each interspace between the reluctance poles 4 in each pole group, but with no permanent-magnetic poles placed between the different pole groups.

In the case of a motor of the kind described above and as illustrated in FIG. 1, it is only the magnetic flux from the permanent-magnetic poles 3 which passes through those parts of the back of the stator 1 to which the permanent-magnetic poles are attached. This does not require the cross-sectional area, i.e. the radial height, of these parts of the stator back to be as large as that if those parts of the stator back through which the magnetic flux generated by the working windings 5A, 5B through the reluctance poles 4 flows.

Furthermore, the height of the permanent-magnetic poles 3, i.e. their radial dimension, may advantageously be smaller than the radial dimension of the reluctance poles 4. Consequently, it is quite possible to reduce the overall dimensions of the stator 4 over the positions of the two permanent-magnetic poles 3 while retaining the overall stator dimensions in the direction perpendicular thereto. i.e. in the direction in which the coil sides of the working windings 5A, B are located.

Since, in the mass production of motors of the kind concerned here, the sheet metal stampings which form the stator core are produced from metal strip, there is no reason whatsoever to reduce the cross-sectional area available for the stator winding by curving the outer contours of the stator core. The outer contours of a low-price motor based on the principle described above and illustrated in FIG. 1 should therefore be rectangular, as illustrated schematically in FIG. 2. Those parts in FIG. 2 which correspond to parts shown in FIG. 1 are identified with the same reference signs.

Figure 2:
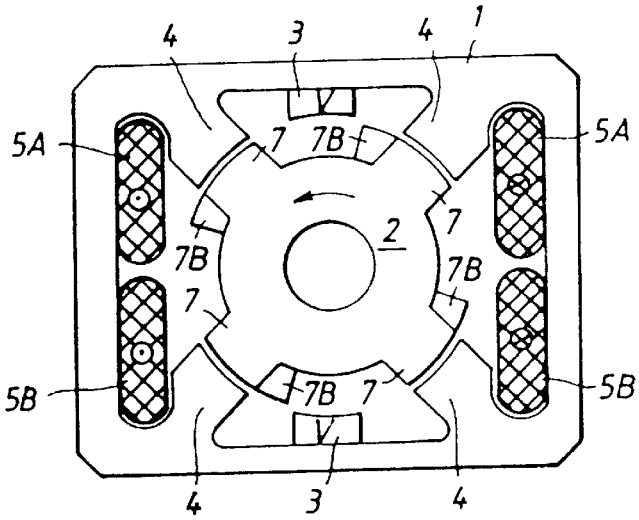
FIG. 2 illustrates in a similar fashion a second exemplifying embodiment of a motor according to the invention.

It will be seen that the FIG. 2 embodiment affords still greater space for the working windings 5A, 5B than the FIG. 1 embodiment, and consequently enables the working winding to have a still higher ampere turns, thereby increasing the torque generated by the motor.

A comparison of a motor having a stator constructed in accordance with FIG. 1 and a motor having a stator constructed in accordance with FIG. 2, but with identical rotors and stators of equal overall dimensions in the direction extending perpendicular to the line along which the permanent-magnetic poles 3 are placed, shows that a motor having the stator stamping shape shown in FIG. 2 requires about 20% less metal sheet for stator manufacture and is able, at the same time, to develop a torque which is about 20% greater than the torque developed by the motor illustrated in FIG. 1.

Figure 3:
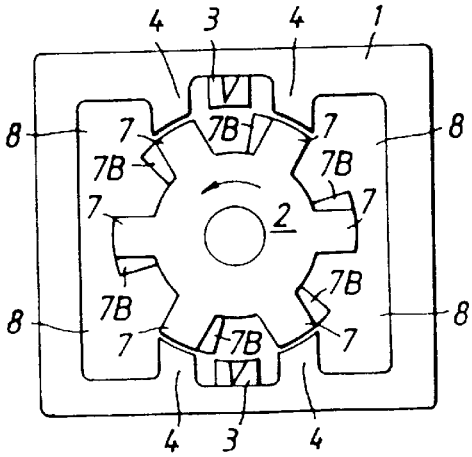
FIG. 3 is a similar illustration of a third exemplifying embodiment of a motor according to the invention.

A further development of the present invention is based on the realization that the number of ferromagnetic reluctance poles 4 on the stator coacting with the magnetizing winding or working winding can be reduced so that the number of these reluctance poles 4 will be smaller than the number of rotor reluctance poles 7. One condition in this respect, however, is that the stator reluctance poles 4 coacting with the working winding are still arranged so that all of the poles 4 will be located simultaneously essentially opposite a respective rotor reluctance pole 7 as the motor runs. FIG. 3 illustrates schematically and by way of example a motor which is constructed in accordance with this principle and which can be considered a modification of the motor illustrated in FIG. 2.

In the case of the motor illustrated in FIG. 3, the rotor 2 is provided with six reluctance poles 7 which are formed with projecting parts or noses 7B in the afore-described manner, whereas the stator 1 is provided with two diametrically opposed groups of magnetic poles, each including two ferromagnetic reluctance poles 4 and an intermediate permanent-magnetic pole 3, similar to the motor illustrated in FIG. 2.

Thus, in comparison with a motor according to the aforesaid Swedish Patent Application 8802972-3 (=WO 90/02437), the motor illustrated in FIG. 3 lacks two ferromagnetic reluctance poles and four permanent-magnetic poles on the stator 1. It will be realized immediately from the FIG. 3 illustration that this results in still greater space 8 for accommodating the magnetizing or working windings, which are not shown in FIG. 3.

When a motor constructed in accordance with FIG. 3 is compared with a motor constructed in accordance with FIG. 2 and it is assumed that the surfaces of the reluctance poles 4, 7 which face the air gap are of the same size in both cases and that the magnetizing or working windings develop magnetomotive force of equal magnitudes in both directions, a motor constructed in accordance with FIG. 3 will generate a torque which is 1.5 times greater than the torque generated by a motor which is constructed in accordance with FIG. 2.

At the same time, the motor constructed in accordance with FIG. 3 requires a 50% higher current supply frequency at the same speed. The motor illustrated in FIG. 3 can therefore be equated with a motor according to FIG. 2 that is provided with a mechanical speed transmission having a transmission ratio of 3:2.

A motor constructed in accordance with FIG. 3 may be advantageous in the case of relatively low-speed applications in which the increase in current supply frequency required by the FIG. 3 embodiment in comparison with the FIG. 2 embodiment can be accepted, both with respect to the iron losses in the motor and in the switch frequency in the electronic supply circuit of the motor.

In the case of motors provided with a rectangular stator core, for example in accordance with FIG. 2 or FIG. 3, the magnetizing windings may be given the form of coil windings instead of bundle or skein windings. These coil windings may be arranged around those sides (legs) of the stator core 1 which connect the two diametrically opposed pole groups 3, 4. In the case of very small motors, these coil windings may be mounted on circuit boards, optionally together with the electronic supply circuit, so as to obtain a flat electronic motor.

The stator core 1 of small motors may also be configured with solely one side (leg) connecting the two diametrically opposed pole groups 3, 4, so that the stator core 1 will have a generally C-shaped cross-section. Of course, the one remaining side (the leg) of the stator 1 and also the portions of the core which support the poles 3, 4 must be given a larger cross-sectional area for the magnetic flux than in the case of the embodiments according to FIGS. 2 and 3. In a motor of this kind, it is sufficient to provide one single magnetizing winding in the form of a coil winding arranged around the single side (leg) of the stator core 1.

An extreme, conceivable variant of the type of motor illustrated in FIG. 3 is one in which the number of rotor reluctance poles 7 is many times greater than the number of stator poles 3, 4. In a motor of this kind, the stator may suitably have the form of a so-called short stator which extends over only a small part of the rotor circumference, i.e. does not surround the rotor.

FIG. 4 illustrates schematically and in partial end view an exemplifying embodiment of such a motor. In this case, it is necessary for the short stator 9 to include at least two pole groups, each including at least two ferromagnetic reluctance poles 4 and at least one permanent-magnetic pole 3. In this embodiment, the magnetizing or working winding 5 is a coil winding which embraces that part of the stator core 9 which connects the two pole groups.

Several such short stators may be arranged to coact with one and the same rotor, for example two short stators may be mounted in diametrically opposed relationship. Extreme variants of a short- stator motor include a linear motor or a motor whose rotor is comprised of only one arcuate segment along whose circumference the reluctance poles that have outwardly projecting noses are placed.

As before mentioned, the principle of the present invention lies in the reduction of the number of permanent-magnetic poles and optionally also the number of ferromagnetic reluctance poles on the motor-part that is provided with the magnetizing or working winding, so that the number of poles of this kind will be smaller than the number of reluctance poles provided with a projecting nose and mounted on the other motor part.

This principle can also be applied to types of motors that have an axial-radial magnetic flux path, i.e. a motor of the kind illustrated in FIGS. 5–7 of the aforementioned Swedish Patent Application 8802972-3 (=WO 90/02437). This enables, in principle, the number of permanent-magnetic poles to be reduced equally in each of the two axially spaced, cylindrical air gaps. However, a permanent-magnetic pole must be present at each air gap.

The reduction in the number of permanent-magnetic poles also results, however, in a reduction in the torque generated by the motor, as before mentioned, which in this case can be compensated for by axially extending the magnetizing winding, which has the form of a coil winding.

A reduction in the number of permanent-magnetic poles lowers the manufacturing costs of the motor. As before mentioned, it is possible with this type of motor to reduce the number of ferromagnetic reluctance poles on the stator, so that there will be fewer stator reluctance poles than those rotor reluctance poles that have an outwardly projecting nose.

However, since a reduction in the number of ferromagnetic stator reluctance poles in this motor construction will not increase the space available for the magnetizing winding on the stator, there is normally no reason to reduce the ferromagnetic stator reluctance poles to a number which is smaller than the number of rotor reluctance poles.

In the case of a motor having an axial-radial magnetic flux path, it is also conceivable to form one of the two axially spaced, cylindrical air gaps without providing any poles at all on either the rotor or the stator, i.e. with mutually facing, smooth surfaces on the rotor core and the stator core, the smooth air gap being dimensioned in a manner to offer relatively small reluctance to the passage of the magnetic flux that is determined by the configuration of the magnetic poles on the stator and the rotor at the second air gap.

Such an embodiment with only one air gap that is provided with poles and a smooth air gap is possible both in a motor construction according to the present invention and with a motor construction according to the aforesaid Swedish Patent Application 8802972-3 (=WO 90/02437), i.e. irrespective of whether the number of permanent-magnetic poles and ferromagnetic reluctance poles on one motor part is the same as or smaller than the number of reluctance poles on the other motor part which are provided with noses.

A further development of the present invention is based on the realization that the reluctance poles on one motor part which are provided with noses can be replaced with similarly configured permanent-magnetic poles. This would be particularly advantageous in the case of very small motors, because when the dimensions of a motor decrease, the magnetomotive force that can be developed by the working winding at permitted winding temperatures also decreases.

For example, if the motor diameter were to be halved, only about 35% of the earlier magnetomotive force would be available, because the air gap between rotor and stator cannot be reduced to a corresponding extent, for mechanical reasons. This fact restricts the use of the reluctance principle in very small motors. Consequently, the use of permanent-magnetic poles is preferred in very small motors, particularly since the cost of permanent-magnetic poles is low as a result of the small amount of permanent-magnetic material consumed.

FIGS. 5 and 6 illustrate schematically, and by way of example, a motor according to the invention constructed in the aforesaid manner. FIG. 5 is an end view of the motor and FIG. 6 is a developed view of the construction and arrangement of the permanent-magnetic poles mounted on the rotor.

The construction of the stator 1 with its ferromagnetic reluctance poles 4 and permanent-magnetic poles 3 and magnetizing or working windings 5A, 5B corresponds to the construction of the motors earlier described with reference to FIGS. 2 and 3. However, in the case of the embodiments illustrated in FIGS. 5, 6, the magnetizing windings 5A, 5B are intended to generate a magnetic flux which coincides with the polarity of the permanent-magnetic poles 3, whereas in the case of the earlier described embodiments with reluctance poles provided on the rotor, the converse condition is applied to advantages.

As before mentioned, in the case of the motor construction illustrated in FIGS. 5, 6, the rotor reluctance poles provided with noses have been replaced with permanent-magnetic poles configured and arranged in the manner best seen from FIG. 6. This means, in principle, that each reluctance pole that is provided with a nose, together with the pole gap between it and the next-following reluctance pole, has been replaced with a pair of permanent-magnetic poles 10 of mutually opposite polarities and configured with projecting parts or noses 10A in the desired direction of rotation.

The narrower width of each such permanent-magnetic pole 10 corresponds generally with the width of the ferromagnetic reluctance poles 4 and the permanent-magnetic poles 3 of the stator, whereas the greater width of the permanent-magnetic poles 10 corresponds with the pole pitch of the poles 3, 4 on the stator 1 and, consequently, also with the pole pitch of the permanent-magnetic poles 10 on the rotor.

The motor illustrated in FIGS. 5, 6 operates in the following manner. When no current passes through the stator windings 5A, 5B, the rotor 2 will position itself in a position in which the stator permanent-magnetic poles 3 will attract rotor permanent-magnetic poles 10 of opposite polarity. The attracted rotor permanent-magnetic poles 10 will then take a position with maximum overlap with the stator permanent-magnetic poles 3.

When current is passed through the stator windings 5A, 5B, the stator reluctance poles 4 will attract the rotor permanent-magnetic poles 10 of opposite polarity, the projecting noses 10A of these poles 10 being located adjacent the stator reluctance poles concerned. Provided that the pulling force exerted by the reluctance poles 4 is greater than the retaining force exerted on the rotor 2 by the permanent-magnetic poles 3 of the stator, the rotor will move through one pole pitch in the direction of the projecting noses 10A of the permanent-magnetic poles 10 of the rotor 10.

When the attracted poles 10 on the rotor have reached approximately maximum overload with the stator reluctance poles 4, the current to the stator windings 5A, 5B is switched off by the magnetizing system, not shown. In this operational state of the motor, the permanent-magnetic poles 3 of the stator are overlapped by those permanent-magnetic poles 10 on the rotor 2 which repel the permanent-magnetic poles 3 on the stator. Those rotor poles 10 which have opposite polarity and the projecting noses 10A of which are located adjacent the permanent-magnetic poles 3 of the stator 1 are then attracted by these poles and will move through one pole pitch in the direction of the outwardly projecting noses 10A of the motor poles 10.

It will be noted that the permanent-magnetic poles 10 on the rotor need not be separated physically, and that they can be provided, advantageously, by magnetizing a ring of permanent-magnetic material around the periphery of the ferromagnetic core of the rotor. This technique is known per se.

The principle that has been applied in the construction of the motor illustrated in FIGS. 5, 6, namely the principle of replacing rotor reluctance poles that have projecting noses with permanent-magnets that have projecting noses, may also be applied to the type of motor described in the Swedish Patent Application 8802972-3 (=WO 90/02437).

In the case of an electric motor stator provided with a working winding, efforts are always made to achieve the best possible balance between that part of the total cross-sectional area of the stator which is occupied by ferromagnetic material for conducting the magnetic flux and the remainder of the cross-sectional area available for accommodating the working winding. This is so, because it is the product of the change in the magnetic flux, on the one hand, and the magnetomotive force of the working winding caused by rotor movement, on the other hand, that is proportional to the motor torque and which should therefore be maximized.

In the case of the motor according to the present invention, or a Motor constructed in accordance with Swedish Patent Application 8802972-3, which have a magnetic circuit constructed from parallel, sheet metal stampings, the aforesaid maximization provides a best interval for pole flux magnitude which corresponds, in general, with a value of the magnetic flux density in the overlap area between the coacting poles which is below the value at which magnetic saturation occurs in the magnetic steel sheets.

To ensure that the torque developed by the motor will be as uniform as possible, it is endeavoured to change the pole flux essentially in proportion to the change in the overlap area between the mutually coacting stator and rotor poles. This requires that the change in flux will not be limited by magnetic saturation in any other part of the magnetic circuit, i.e. that the magnetic flux density in the overlap area between the mutually coacting poles can be kept at a generally constant level.

For a given value of the magnetomotive force which acts over the overlap area between stator poles and rotor poles, this can be achieved either by selecting a sufficiently large air gap between rotor and stator poles or by giving the stator pole surfaces and/or the rotor pole surfaces a nature such as to restrict flux density by magnetic saturation in these surfaces. This latter method is preferred, primarily because the torque developed is greater than that developed with the first mentioned method.

The simplest method of achieving magnetic saturation of the pole surface layers is to thin-out the plate pack in the vicinity of the pole surface, for instance by terminating every second or third plate a few millimeters from the pole surface, while continuing with the remaining plates right up to said pole surface. This method of construction can be used advantageously with the ferromagnetic reluctance poles on the rotor and/or the stator of a motor constructed in accordance with the present invention or a motor constructed in accordance with the earlier mentioned Swedish patent application.

I claim:

1. An electric motor comprising a first motor part and a second motor part (1, 2) which are rotatable relative to one another and each of which has a ferromagnetic core and which are separated by an air gap (6) lying between the ferromagnetic cores, wherein the ferromagnetic core of said first motor part (1) has provided on the surface thereof which faces the air gap (6) a plurality of salient magnetic poles which are disposed sequentially and in spaced relationship in the direction of rotation, and of which some are ferromagnetic (4) and some are permanent-magnetic (3) and all of which are magnetically connected to a magnetizing winding (5A, 5B) for simultaneous magnetization of both the ferromagnetic (4) and permanent-magnetic (3) poles, wherein the ferromagnetic core of the said other motor part (2) is provided on the surface thereof facing the air gap (6) and opposite the magnetic poles (3, 4) on the core of the first part (1) with a row of salient ferromagnetic reluctance poles (7) which [extend] *are arranged in a row extending* in said direction of rotation and which have a constant pole pitch and are spaced-apart equidistantly, wherein each such reluctance pole (7) [over a portion thereof has a width in the direction of rotation which corresponds essentially to half said pole pitch and over the remaining portion thereof is smaller such that each reluctance pole (7) has a part] *comprises a first portion and a second portion* (7B) which projects in a predetermined direction common to all reluctance poles (7), wherein the ferromagnetic and permanent-magnetic poles (3, 4) on the core *of* the first motor part (1) have a width in the direction of rotation which corresponds essentially to the width of the [narrow part] *first portion* of the reluctance poles (7) and are so positioned that during relative rotation of the two motor parts (1, 2), all ferromagnetic poles (4) will be located simultaneously opposite their respective reluctance poles (7), on the second motor part (2) and, similarly, such that all permanent-magnetic poles (3) will be simultaneously located opposite their respective reluctance poles (7), *and* wherein the number of permanent-magnetic poles (3) is smaller than the number of reluctance poles (7) on the core of the second motor part (2), such that no permanent-magnetic poles (3) are present in some of those positions which would be occupied by such permanent-magnetic poles if a number of permanent-magnetic poles (3) equal to the number of reluctance poles (7) of the core of the second motor part (2) were distributed uniformly.

2. A motor according to claim 1, wherein the number of ferromagnetic poles (4) on the core of the first motor part (1) is smaller than the number of reluctance poles (7) on the core of the second motor part (2), such that no ferromagnetic poles (4) are present on the core of the first motor part (1) at a number of those positions in which such ferromagnetic poles would be present with uniform distribution of a number of ferromagnetic poles (4) equal to the number of reluctance poles (7) present on the core of the second motor part (2).

3. A motor according to claim 1, wherein those spaces on the core of the first part (1) in which no permanent-magnetic and/or ferromagnetic poles (3, 4) are present are used to accommodate the magnetizing winding (5A,5B).

4. A motor according to claim 1 having a cylindrical air gap (6), wherein the first motor part (1) forms a stator which lies outside the air gap (6) and the second motor part forms a rotor (2) which lies inwardly of the air gap (6), wherein stator core (1) is provided with an even number of magnetic pole groups; in that each such pole group includes at least two ferromagnetic poles (4) having a pole pitch which corresponds to the pole pitch of the reluctance poles (7) on the rotor core (2), at least two such pole groups additionally including at least one ferromagnetic pole (3) placed in the gap between two ferromagnetic poles (4) of the respective pole group; and in that the two permanent-magnetic poles (3) have mutually opposed polarities relative to the air gap (6) and each pole group is so magnetically connected to he magnetizing windings (5A, 5B) that all of the poles (3, 4) in the pole group are magnetized in mutually the same direction but in opposite directions relative to adjacent pole groups.

5. A motor according to claim 4, wherein the stator core (1) has a generally rectangular cross-section and carries on each of two opposing sides a pole group which includes at least two ferromagnetic poles (4) and at least one permanent-magnetic pole (3) placed in the gap therebetween.

6. A motor according to claim 5, wherein the magnetizing winding is comprised of coil windings arranged around both other sides of the stator core (1).

7. A motor according to claim 4, wherein the stator core (1) has a generally C-shaped cross-section and carries on each of its two opposing legs a pole group which includes at least two ferromagnetic poles (4) and at least one permanent-magnetic pole (3) placed in the gap therebetween; and in that the magnetizing winding is comprised of a coil winding arranged around the centre part of the stator core connecting the two legs of the stator core (1).

8. A motor according to claim 2 having a cylindrically curved air gap, wherein the first motor part forms a stator which lies outside the air gap and the second motor part forms a rotor which lies inwardly of the air gap, wherein the stator core (9) extends along only a limited part of the length of the air gap as seen in the direction of relative rotation and is provided with at least two groups of magnetic poles each including two ferromagnetic poles (4) and a permanent-magnetic pole (3) placed in the gap therebetween; in that the permanent-magnets (3) in the two pole groups have mutually opposite polarities in relation to the air gap; and that the magnetizing winding (5) is comprised of a coil winding arranged around that part of the stator core (9) which magnetically connects the two pole groups.

9. A motor according to claim 8, wherein the motor includes a plurality of stator cores (9) of the aforesaid construction arranged in different positions along the rotor core (2).

10. A motor according to claim 1, wherein the ferromagnetic cores of the two motor parts are separated by two cylindrical, coaxial and axially spaced air gaps; in that the cores of the two motor parts are provided with ferromagnetic and permanent-magnetic poles and reluctance poles respectively in the aforesaid manner at at least one air gap; and in that the magnetizing winding is comprised of a coil winding arranged, when seen axially, between said two air gaps.

11. A motor according to claim 1, wherein the cores of the two motor parts are also provided with ferromagnetic and permanent-magnetic poles and reluctance poles respectively in the aforesaid manner at the second air gap; and in that the permanent-magnetic poles have oppositely directed polarities at the two air gaps.

12. A motor according to claim 11, wherein the cores of the two motor parts have smooth surfaces on which no poles are present at the second air gap.

13. A motor according to claim 1, wherein the reluctance poles on the core of the second motor part (2) are replaced with permanent-magnetic poles (10) in a manner such that instead of each reluctance pole, there are two permanent-magnetic poles (10) which are located adjacent one another in the direction of a rotation and which have mutually opposite polarities; in that each such permanent-magnetic pole (1) has [a width in the direction of rotation which over a portion of the pole is equal to half the pole pitch and over the remainder of the pole is narrower so that each permanent-magnetic pole (10) has a part (10A)] *a first portion and a second portion (10A) each of* which [projects] *project* in a direction common to all poles; and in the permanent-magnetic poles (3) on the core of the first motor part (1) are intended to be magnetized by the magnetizing winding (5A, 5B) in a direction which coincides with its permanent-magnetic polarity.

14. A motor according to claim 2, wherein those spaces on the core of the first part (1) in which no permanent-magnetic and/or ferromagnetic poles (3, 4) are present are used to accommodate the magnetizing winding (5A,5B).

15. A motor according to claim 14 having a cylindrical air gap (6), wherein the first motor part (1) forms a stator which lies outside the air gap (6) and the second motor part forms a rotor (2) which lies inwardly of the air gap (6), wherein the stator core (1) is provided with an even number of magnetic pole groups; in that each such pole group includes at least two ferromagnetic poles (4) having a pole pitch which corresponds to the pole pitch of the reluctance poles (7) on the rotor core (2), at least two such Dole groups additionally including at least one ferromagnetic pole (3) placed in the gap between two ferromagnetic poles (4) of the respective pole group; and in that the two permanent-magnetic poles (3) have mutually opposed polarities relative to the air gap (6) and each pole group is so magnetically connected to the magnetizing windings (5A, 5B) that all of the poles (3, 4) in the pole group are magnetized in mutually the same direction but in opposite directions relative to adjacent pole groups.

16. A motor according to claim 15, wherein the stator core (1) has a generally rectangular cross-section and carries on each of two opposing sides a pole group which includes at least two ferromagnetic poles (4) and at least one permanent-magnetic pole (3) placed in the gap there between.

17. A motor according to claim 16, wherein the magnetizing winding is comprised of coil windings arranged around both other sides of the stator core (1).

18. A motor according to claim 2, wherein the ferromagnetic cores of the two motor parts are separated by two cylindrical, coaxial and axially spaced air gaps; in that the cores of the two motor parts are provided with ferromagnetic and permanent-magnetic poles and reluctance poles respectively in the aforesaid manner at at least one air gap; and in that the magnetizing winding is comprised of a coil winding arranged, when seen axially, between said two air gaps.

19. A motor according to claim 18, wherein the reluctance poles on the core of the second motor part (2) are replaced with permanent-magnetic poles (10) in a manner such that instead of each reluctance pole, there are two permanent-magnetic poles (10) which are located adjacent one another in the direction of a rotation and which have mutually opposite polarities; in that each such permanent-magnetic pole (10) has [a width in the direction of rotation which over a portion of the pole is equal to half the pole pitch and over the remainder of the pole narrower so that each permanent-magnetic pole (10) has part (10A)] *a first portion and a second portion (10A) each of* which [projects] *project* in a direction common to all poles; and in that the permanent-magnetic poles (3) on the core of the first motor part (1) are intended to be magnetized by the magnetizing winding (5A, 5B) in a direction which coincides with its permanent-magnetic polarity.

20. A motor according to claim 16, wherein the reluctance poles on the core of the second motor part (2) are replaced with permanent-magnetic poles (10) in a manner such that instead of each reluctance pole, there are two permanent-magnetic poles (10) which are located adjacent one another in the direction of a rotation and which have mutually opposite polarities; in that each such permanent-magnetic pole (10) has a [width in the direction of rotation which over a portion of the pole is equal to half the pole pitch and over the remainder of the pole is narrower so that each permanent-magnetic pole (10) has a part (10A)] *a first portion and a second portion (10A) each of* which [projects] *project* in a direction common to all poles; and in that the permanent-magnetic poles (3) on the core of the first motor part (1) are intended to be magnetized by the magnetizing winding (5A, 5B) in a direction which coincides with its permanent-magnetic polarity.

* * * * *